(12) United States Patent
El-Antably et al.

(10) Patent No.: US 7,479,716 B2
(45) Date of Patent: Jan. 20, 2009

(54) COOLING SYSTEM FOR A STATOR ASSEMBLY

(75) Inventors: Ahmed M. El-Antably, Indianapolis, IN (US); Timothy J. Alfermann, Fishers, IN (US); Arthur L. Mc Grew, Jr., Plainfield, IN (US); Charles B. Lucas, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 516 days.

(21) Appl. No.: 11/363,549

(22) Filed: Feb. 27, 2006

(65) Prior Publication Data

US 2007/0200441 A1 Aug. 30, 2007

(51) Int. Cl.
*H02K 21/24* (2006.01)
(52) U.S. Cl. .............................. 310/58; 310/52; 180/65.1
(58) Field of Classification Search .................... 310/58, 310/52, 54; 180/65.1
See application file for complete search history.

(56) References Cited

U.S. PATENT DOCUMENTS

| | | | | |
|---|---|---|---|---|
| 4,415,822 A * | 11/1983 | Aiba | ............................ | 310/59 |
| 6,617,717 B2 * | 9/2003 | Okawa | ........................... | 310/59 |
| 6,762,520 B1 * | 7/2004 | Ehrhart et al. | ................. | 310/86 |
| 6,933,633 B2 * | 8/2005 | Kaneko et al. | ................. | 310/52 |
| 2002/0047485 A1 * | 4/2002 | Okawa | ......................... | 310/263 |
| 2002/0074871 A1 * | 6/2002 | Kikuchi et al. | ................. | 310/58 |
| 2003/0062780 A1 * | 4/2003 | Kaneko et al. | ................. | 310/58 |
| 2003/0132673 A1 | 7/2003 | Zhou et al. | ..................... | 310/54 |
| 2004/0100154 A1 * | 5/2004 | Rahman et al. | ................ | 310/54 |
| 2005/0206251 A1 | 9/2005 | Foster | ........................... | 310/59 |
| 2005/0236920 A1 * | 10/2005 | Kusase et al. | ................ | 310/168 |

* cited by examiner

*Primary Examiner*—Gary F. Paumen

(57) ABSTRACT

A stator assembly is provided having a generally annular stator core including a plurality of radially inwardly extending stator teeth. A stator wire is wound around each of the plurality of stator teeth to form a plurality of stator coils. Each of the plurality of stator coils are spaced apart to at least partially define a plurality of generally axially extending cooling channels through which a cooling medium, such as oil, flows. Additionally, the plurality of stator teeth each include a respective flanged end portion each adapted to retain an axially extending strip member. The strip member at least partially defines the cooling channel. The cooling medium operates to cool the plurality of stator coils. In the preferred embodiment, at least a portion of the flow of the cooling medium within the cooling channel is turbulent. Additionally, an electromechanical hybrid transmission is disclosed with the stator assembly provided.

19 Claims, 3 Drawing Sheets

US 7,479,716 B2

COOLING SYSTEM FOR A STATOR ASSEMBLY

GOVERNMENT LICENSE RIGHTS

The U.S. Government has a paid-up license in this invention and the right in limited circumstances to require the patent owner to license others on reasonable terms as provided for by the terms of ZCL-3-32060-02 awarded by NREL/DOE.

TECHNICAL FIELD

The present invention relates generally to a stator assembly and more specifically to a system for cooling the stator assembly.

BACKGROUND OF THE INVENTION

Electric devices such as motors and generators having a stator secured within a housing of the motor/generator are well known. A rotor mounted on a shaft is coaxially positioned within the stator and is rotatable relative to the stator about the longitudinal axis of the shaft. The passage of current through the stator creates a magnetic field tending to rotate the rotor and shaft. It is also well known that it is necessary to maintain the stator within a predefined temperature range and to keep the stator free of contaminants in order to ensure optimal performance and reliability of the motor/generator.

Two primary changes can be made to the stator that will increase the torque density or the torque per unit weight of the motor/generator. One primary change is to increase the number of stator windings. The greater the slot fill factor, or percent of the motor/generator's volume that is occupied by windings, the greater the motor's torque will be. Increasing a motor/generator's slot fill factor will also increase the efficiency of the device. This method for improving torque, however, is physically limited by the shape and size of the stator. The other primary change employed to increase the motor's torque density involves increasing the amount of current that flows through the stator windings. Increases in current flowing through the stator windings cause increases in stator heating due to resistive or ohmic heating.

One application of the electric motor/generator described hereinabove is the hybrid electric vehicle. Hybrid electric vehicles offer potential improvements in fuel economy and reductions in tailpipe emissions. A hybrid electric vehicle incorporates a traditional internal combustion engine combined with an electromechanical hybrid transmission having one or more electric motor/generators arranged in series or parallel and gearing arrangements such as planetary gear sets. The electric motor/generators assist in propulsion or energy absorption (storage) depending on the mode of operation. As with any energy conversion device, the motor/generators are less than 100 percent efficient, and reject some energy as heat. Efficient removal of this waste heat is required in order to achieve a highly efficient operating mode of the hybrid electric vehicle.

SUMMARY OF THE INVENTION

A stator assembly is provided having a generally annular stator core including a plurality of radially inwardly extending stator teeth. A stator wire is wound around each of the plurality of stator teeth to form a plurality of stator coils. Each of the plurality of stator coils are spaced apart to at least partially define a plurality of generally axially extending cooling channels through which a cooling medium, such as oil, flows. Additionally, the plurality of stator teeth each include a respective flanged end portion each adapted to retain an axially extending strip member. The strip member at least partially defines the cooling channel. The cooling medium operates to cool the plurality of stator coils. In the preferred embodiment, at least a portion of the flow of the cooling medium within the cooling channel is turbulent.

A first and second end ring may be disposed on opposite axial ends of the stator assembly. The first end ring defines a first chamber operable to communicate the cooling medium to each of the plurality of cooling channels and the second end ring defines a second chamber operable to receive the cooling medium from each of the plurality of cooling channels. An oil transfer plate may be provided to communicate the cooling medium to at least one bore defined by the first end ring. The at least one bore is configured to communicate cooling medium to the first chamber at points radially coincident with each of the cooling channels and may be selectively configured to communicate cooling medium to the first chamber in one of a generally radial and a generally axial orientation or any orientation therebetween. Additionally, a motor assembly and an electromechanical hybrid transmission are disclosed with the stator assembly provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
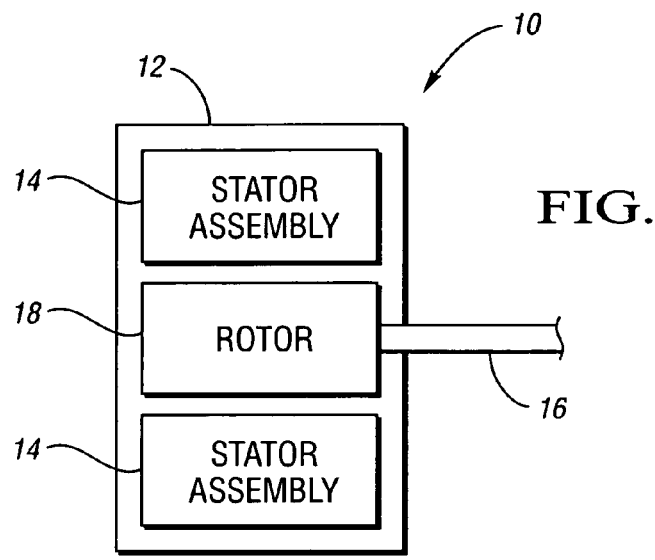
FIG. 1 is a schematic cross-sectional diagram of an electric motor including a stator assembly in accordance with the present invention.

Referring to the drawings wherein like reference numbers represent the same or similar components throughout the several figures, there is shown in FIG. 1 a schematic representation of an electric motor 10. The electric motor 10 is shown for illustrative purposes in accordance with the preferred embodiment; however it should be appreciated the present invention is adapted for use with other electric motor configurations and other electrical devices such as, for example, a generator. The electric motor 10 includes a housing 12, a stator assembly 14, a shaft 16, and a rotor 18. The stator assembly 14 is substantially annular and is configured to remain stationary relative to the housing 12 during operation of the motor 10. The rotor 18 is fixed to the shaft 16 for unitary rotation therewith and is generally circumscribed by the stator 14. The rotor 18 and shaft 16 are rotatable relative to the housing 12 and the stator 14.

Figure 2:
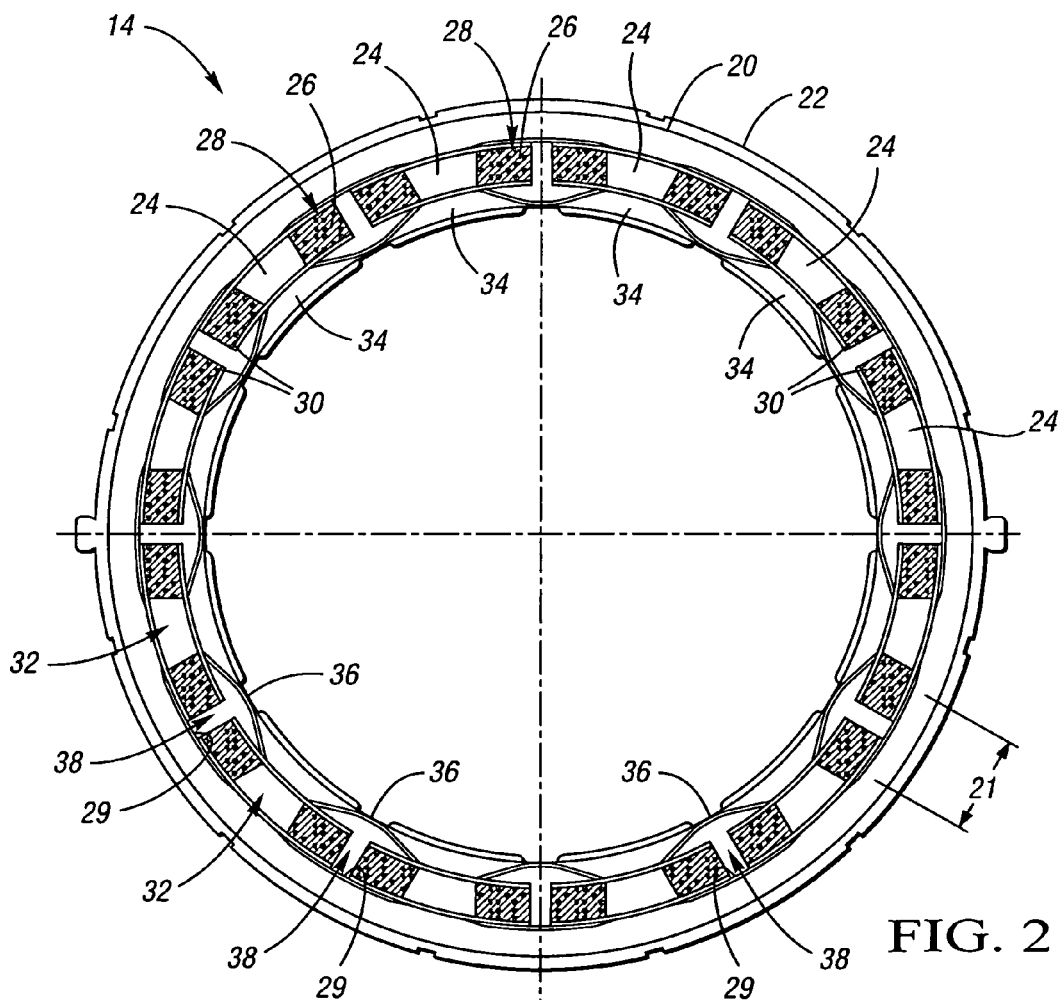
FIG. 2 is a sectional view of the stator assembly for use with the distributed cooling system of the present invention.

Referring to FIG. 2, the stator assembly 14 preferably includes a stator core 20 contained within a stator sleeve or shell 22. A plurality of stator teeth 24 extend radially inward from the stator core 20 forming slots 21 therebetween. A stator wire 26 is wound or wrapped around each of the stator teeth 24 to at least partially fill the slots 21 and form a stator coil 28. The stator coil 28 is impregnated with epoxy resin 30 such that the stator wire 26, forming the windings of the stator coil 28, are electrically isolated from each other. An epoxy resin type 66-2251 commercially available from Wabash Magnetics LLC., located at 1450 First Street, Wabash, Ind. 46992, is preferably implemented for the epoxy resin 30. According to a preferred embodiment, the stator core 20 is composed of a soft magnetic composite (SMC) to reduce cost and simplify manufacturing, and the stator wire 26 is composed of copper. According to an alternate embodiment, the stator core 20 may be composed of steel laminations. The addition of the epoxy resin 30 in the manner described hereinabove increases the strength of the stator assembly 14 and provides additional damping. This increase in strength of the stator assembly 14 is particularly advantageous for the preferred embodiment wherein the stator core 20 is composed of a soft magnetic composite. The damping characteristics of the epoxy resin 30 allows for the absorption of vibrations generated by the electric motor 10 that may otherwise be objectionable thereby providing smoother operation. It should be appreciated; however, that alternate epoxy resin, stator core and/or stator wire compositions may be envisioned. Additionally, a varnish may be used in lieu of the epoxy resin 30 while remaining within the scope of that which is claimed.

With continued reference to FIG. 2, each stator tooth 24 and stator coil 28 will hereinafter be referred to as a "pole" 32. Each pole 32 is preferably wound separately to maximize the number of windings within a given slot volume, sometimes referred to as slot fill, thereby optimizing the performance of the electric motor 10 (shown in FIG. 1). The stator 14, as shown, includes twelve poles 32; however, those skilled in the art will recognize that more or fewer poles 32 may be provide while remaining within the scope of that which is claimed. The twelve poles 32 are held in relation to one another by the shell 22 and the respective stator coils 28 are electrically interconnected such that current is transferable between poles 32. The stator teeth 24 each terminate in a flanged end portion 34. The flanged end portions 34 of adjacent poles 32 cooperate to retain an axially extending strip member 36 that extends substantially the entire axial length of the stator 14. Preferably, the strip members 36 are formed from a non-metallic material. The strip members 36, the stator coils 28 and the inner wall 29 of the stator core 20 cooperate to define a plurality of axially extending pathways or cooling channels 38 through which cooling fluid may circulate. In the preferred embodiment, oil 40 (shown in FIG. 3) is circulated through the cooling channels 38 to absorb heat generated by the stator 14 and thereby cool the electric motor 10, shown in FIG. 1. As the stator coils 28 are a primary source of heat, the proximity of the cooling channels 38 operate to efficiently cool the electric motor 10. Those skilled in the art will recognize that the cooling channels 38 could be radially delimited by a generally annular, axially extending sleeve or epoxy in lieu of the strip members 36.

The epoxy resin 30 has good thermal conduction properties and therefore enhances the thermal conductivity between the stator coils 28 and the oil 40. Accordingly, the thermal conduction of the epoxy resin 30 facilitates the process of transferring heat from the stator coils 28 to cool the electric motor 10 (shown in FIG. 1). The epoxy resin 30 also acts as an electrical isolator to prevent each of the individual windings of the stator coils 28 from forming an electrical connection therebetween and/or with the stator core 20 and thereby short-circuiting the electric motor 10.

Figure 3:
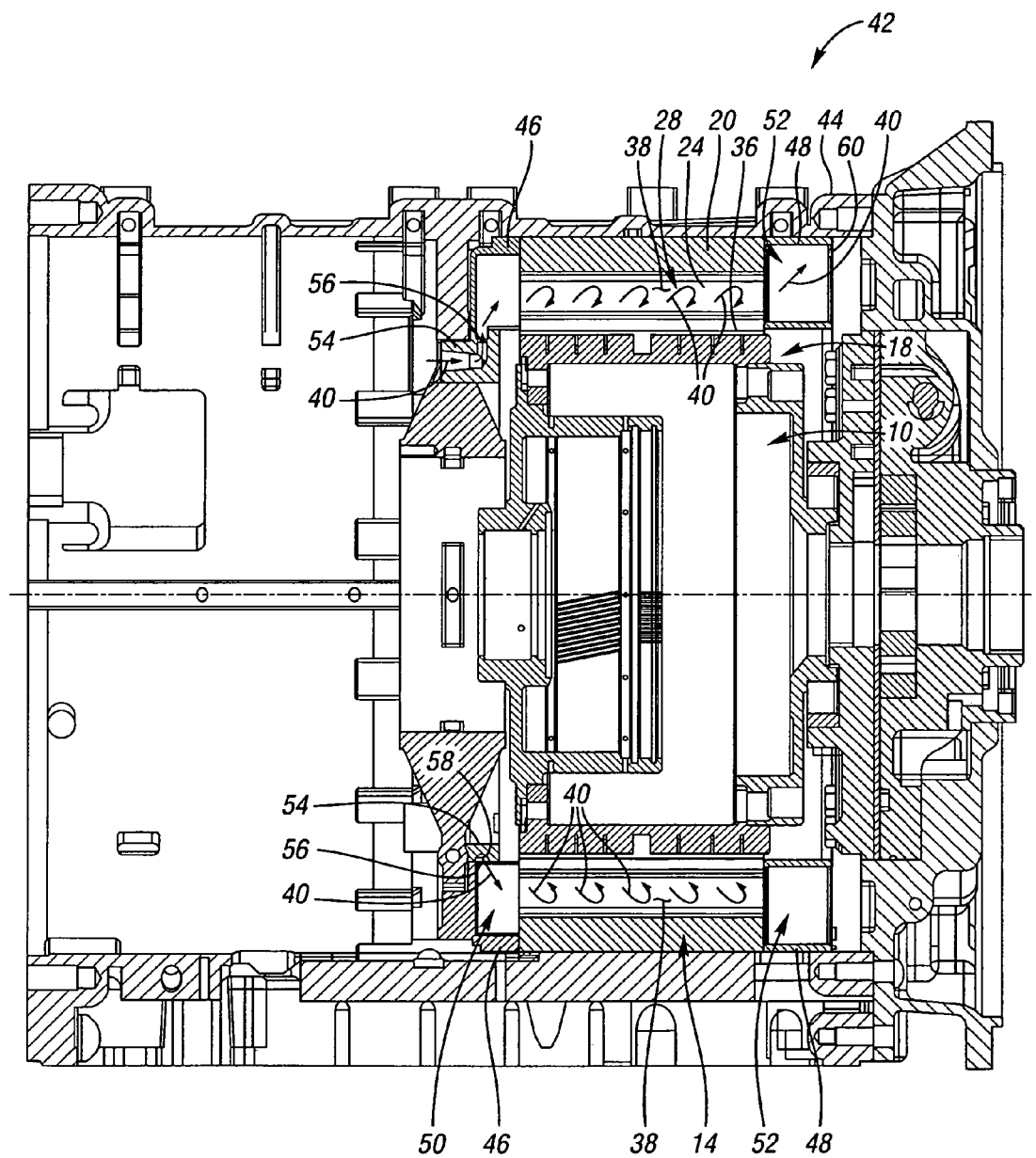
FIG. 3 is a partial cross sectional side view of an electromechanical hybrid transmission incorporating the distributed cooling system of the present invention.

Referring now to FIG. 3 there is shown a partial cross sectional view of a portion of an exemplary electromechanical hybrid transmission 42. The electromechanical hybrid transmission 42 includes a housing 44 sufficiently configured to house two motor units 10, only one of which is shown in FIG. 3. Those skilled in the art will recognize that the motor units 10 may at times be used as generator units depending on the operating mode of the vehicle equipped with the hybrid electromechanical transmission 42. As discussed with reference to FIG. 1, the stator 14 is coaxially disposed about the rotor 18. The stator 14 includes a first and second end ring 46 and 48, respectively, operable to sealingly engage the axial ends of the stator 14. The first and second end rings 46 and 48 define first and second chamber 50 and 52, respectively at opposite ends of the stator. The first and second end rings 46 and 48 are in fluid communication with cooling channels 38 at least partially defined by adjacent stator coils 28 of the poles 34 and as delimited radially inwardly by the axially extending strip members 36 so that a closed cooling circuit is formed within the stator 14.

An oil transfer plate 54 is mounted within the transmission housing 44 and operates to communicate cooling fluid or oil 40, indicated by arrows 40, to the first end ring 46 of the stator 14. The oil 40 is introduced to the first chamber 50 through one of twelve holes or bores 56 defined by the first end ring 46. Each of the twelve bores 56 are preferably radially aligned with a respective cooling channel 38. The oil 40 is communicated to each of the respective bores 56 through an annular groove 58 defined by the oil transfer plate 54. The specific targeting of oil 40 within the first chamber 50 will be discussed in greater detail hereinbelow with reference to FIG. 4. In the preferred embodiment, the flow rate of oil 40 provided to the cooling channels 38 is large enough to induce the turbulent flow of oil 40 within at least a portion of the cooling channels 38. By forcing the oil 40 into a turbulent flow condition, a greater amount of heat energy may be extracted from the stator coils 28 than with laminar flow. Additionally, the turbulent flow of oil 40 may be induced by features provided within the cooling channels 38 such as, for example, vortex generators. Upon exiting the cooling channels 38, the oil 40 enters the second chamber 52 where it exits the stator 14 through a bore 60 defined by the second end ring 48.

Figure 4:
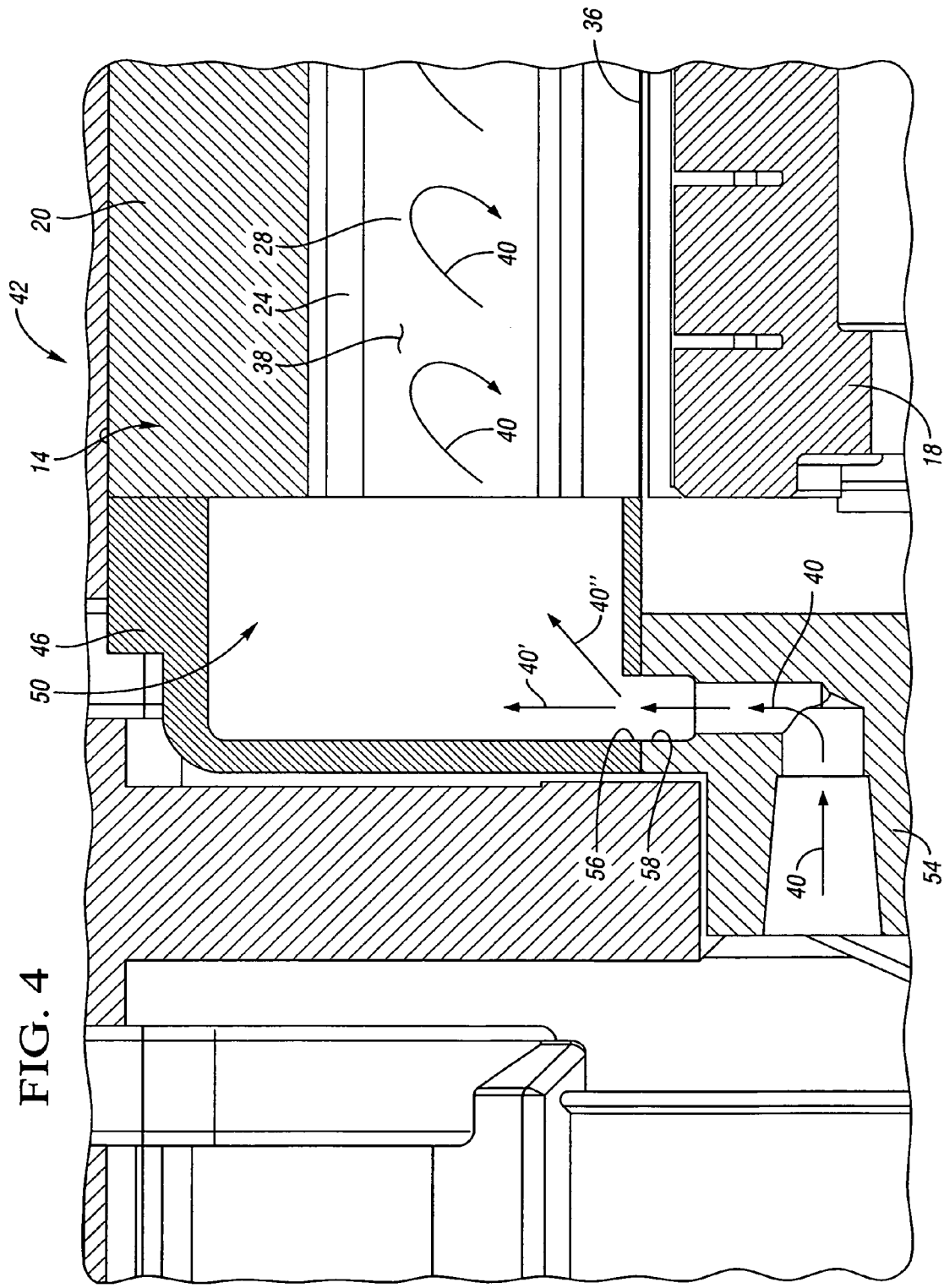
FIG. 4 is a partial cross sectional view of a portion of the electromechanical hybrid transmission of FIG. 3.

Referring to FIG. 4, there is shown a portion of the hybrid electromechanical transmission 42 illustrating two methods of introducing oil 40 into the first chamber 50, via bore 56, for subsequent communication to a respective cooling channel 38. The flow pattern of oil 40 entering the first chamber 50 may be varied depending on the configuration of bore 56. Arrows 40' and 40" indicate two such oil flow patterns each resulting from a different predetermined configuration of bore 56. The oil flow pattern 40' represents a generally radial flow pattern or configuration, which may be helpful to introduce turbulence to the oil 40 prior to entering the cooling channel 38. Alternately, the oil flow pattern 40" represents a generally axial flow pattern or configuration, which more directly targets the cooling channel 38 with oil 40.

In sum, the invention herein described provides for an efficient and closed system for cooling the stator 14. By providing a closed cooling system, losses due to drag caused by oil impinging on the spinning rotor 18 are reduced or eliminated. Additionally, the stator 14 is cooled more uniformly, thereby eliminating potential for localized "hot spots" due to stagnant oil 40 that may reduce the peak power and reliability of the motor 10. Furthermore, present system for cooling the stator 14 may significantly increase the continuous power rating of the motor 10 thereby increasing the power density of the motor 10.

While the best modes for carrying out the invention have been described in detail, those familiar with the art to which this invention relates will recognize various alternative designs and embodiments for practicing the invention within the scope of the appended claims.

The invention claimed is:

1. A stator assembly comprising:
   a generally annular stator core including a plurality of radially inwardly extending stator teeth;
   a stator wire wound around each of said plurality of stator teeth to form a plurality of stator coils;
   wherein each of said plurality of stator coils are spaced apart to at least partially define a plurality of generally axially extending substantially closed cooling channels through which a cooling medium flows; and
   wherein said cooling medium operates to cool said plurality of stator coils.

2. The stator assembly of claim 1, wherein said cooling medium is oil.

3. The stator assembly of claim 1, wherein said plurality of stator teeth each include a respective flanged end portion each adapted to retain an axially extending strip member and wherein said strip member at least partially defines said cooling channel.

4. The stator assembly of claim 1, wherein said stator core is composed of one of soft magnetic composite and steel laminations.

5. The stator assembly of claim 1, further comprising an epoxy resin applied to each of said plurality of stator coils such that at least a portion of said stator wire is coated by said epoxy resin.

6. The stator assembly of claim 1, wherein at least a portion of said plurality of stator coils is coated with varnish.

7. The stator assembly of claim 1, wherein at least a portion of the flow of said cooling medium within said cooling channel is turbulent.

8. The stator assembly of claim 1, further comprising:
   a first and second end ring disposed on opposite axial ends of said stator assembly;
   wherein said first end ring defines a first chamber operable to communicate said cooling medium to each of said plurality of cooling channels; and
   wherein said second end ring defines a second chamber operable to receive said cooling medium from each of said plurality of cooling channels.

9. The stator assembly of claim 8, further comprising an oil transfer plate operable to communicate said cooling medium to at least one bore defined by said first end ring.

10. The stator assembly of claim 9, wherein said at least one bore is configured to communicate cooling medium to said first chamber at points radially coincident with each of said cooling channels.

11. The stator assembly of claim 9, wherein said at least one bore is selectively configured to communicate cooling medium to said first chamber in one of a generally radial and a generally axial orientation.

12. A motor assembly comprising:
   a stator assembly having:
      a generally annular stator core including a plurality of radially inwardly extending stator teeth;
      a stator wire wound around each of said plurality of stator teeth to form a plurality of stator coils;
      wherein each of said plurality of stator coils are spaced apart to at least partially define a plurality of generally axially extending cooling channels through which a cooling medium flows;
      wherein said plurality of stator teeth each include a respective flanged end portion each adapted to retain an axially extending strip member and wherein said strip member at least partially defines said cooling channel;
      a first and second end ring disposed on opposite axial ends of said stator assembly;
      wherein said first end ring defines a first chamber operable to communicate said cooling medium to each of said plurality of cooling channels; and
      wherein said second end ring defines a second chamber operable to receive said cooling medium from each of said plurality of cooling channels; and
      wherein said cooling medium operates to cool said plurality of stator coils.

13. The motor assembly of claim 12, further comprising an epoxy resin applied to each of said plurality of stator coils such that at least a portion of said stator wire is coated by said epoxy resin.

14. The motor assembly of claim 12, wherein at least a portion of the flow of said cooling medium within said cooling channel is turbulent.

15. The motor assembly of claim 12, further comprising:
   an oil transfer plate operable to communicate said cooling medium to at least one bore defined by said first end ring;
   wherein said at least one bore is configured to communicate cooling medium to said first chamber at points radially coincident with each of said cooling channels; and
   wherein said at least one bore is configured to communicate cooling medium to said first chamber in one of a generally radial and a generally axial orientation.

16. An electromechanical hybrid transmission comprising:
   a rotor assembly;
   a stator assembly disposed coaxially with respect to said rotor assembly, the stator assembly having:
      a generally annular stator core including a plurality of radially inwardly extending stator teeth;
      a stator wire wound around each of said plurality of stator teeth to form a plurality of stator coils;
      wherein each of said plurality of stator coils are spaced apart to at least partially define a plurality of generally axially extending cooling channels through which a cooling medium flows;
      wherein said plurality of stator teeth each include a respective flanged end portion each adapted to retain an axially extending strip member and wherein said strip member at least partially defines said cooling channel;
      a first and second end ring disposed on opposite axial ends of said stator assembly;
      wherein said first end ring defines a first chamber operable to communicate said cooling medium to each of said plurality of cooling channels; and
      wherein said second end ring defines a second chamber operable to receive said cooling medium from each of said plurality of cooling channels; and
      wherein said cooling medium operates to cool said plurality of stator coils.

17. The electromechanical hybrid transmission of claim 16, further comprising an epoxy resin applied to each of said plurality of stator coils such that at least a portion of said stator wire is coated by said epoxy resin.

18. The electromechanical hybrid transmission of claim 16, wherein at least a portion of the flow of said cooling medium within said cooling channel is turbulent.

19. The electromechanical hybrid transmission of claim 16, further comprising:

an oil transfer plate operable to communicate said cooling medium to at least one bore defined by said first end ring;

wherein said at least one bore is configured to communicate cooling medium to said first chamber at points radially coincident with each of said cooling channels; and wherein said at least one bore is configured to communicate cooling medium to said first chamber in one of a generally radial and a generally axial orientation.

* * * * *